US008480337B2

United States Patent
Bae

(10) Patent No.: US 8,480,337 B2
(45) Date of Patent: Jul. 9, 2013

(54) DRILL WITH CUTTING INSERTS

(75) Inventor: Byung Gyun Bae, Daegu (KR)

(73) Assignee: TaeguTec, Ltd., Dalseong-gun, Daegu (KR)

( * ) Notice: Subject to any disclaimer, the term of this patent is extended or adjusted under 35 U.S.C. 154(b) by 876 days.

(21) Appl. No.: 12/664,519

(22) PCT Filed: Jun. 14, 2007

(86) PCT No.: PCT/KR2007/002879
§ 371 (c)(1),
(2), (4) Date: Dec. 14, 2009

(87) PCT Pub. No.: WO2008/153233
PCT Pub. Date: Dec. 18, 2008

(65) Prior Publication Data
US 2010/0178122 A1 Jul. 15, 2010

(51) Int. Cl.
*B23B 51/02* (2006.01)
(52) U.S. Cl.
USPC ........... 408/223; 408/713; 408/233; 408/224; 407/113
(58) Field of Classification Search
USPC ................. 408/223, 224, 231, 713, 233, 188, 408/227; 407/713
See application file for complete search history.

(56) References Cited

U.S. PATENT DOCUMENTS

| | | | |
|---|---|---|---|
| 5,503,509 A | 4/1996 | Von Haas et al. | |
| 5,954,459 A * | 9/1999 | Noguchi et al. | 408/59 |
| 5,971,676 A * | 10/1999 | Kojima | 408/231 |
| 6,039,515 A * | 3/2000 | Lamberg | 408/188 |
| 6,213,231 B1 | 4/2001 | Von Haas | |
| 6,929,432 B2 | 8/2005 | Roman et al. | |
| 6,948,891 B2 | 9/2005 | Roman | |
| 7,351,017 B2 | 4/2008 | Kruszynski et al. | |
| 7,677,845 B2 * | 3/2010 | Limell et al. | 408/223 |

(Continued)

FOREIGN PATENT DOCUMENTS

| | | |
|---|---|---|
| CN | 1671499 A | 9/2005 |
| CN | 101720265 B | 2/2012 |

(Continued)

OTHER PUBLICATIONS

Office Action in Chinese application No. 200780053329.2, dated Jan. 27, 2011.

(Continued)

*Primary Examiner* — Eric A Gates
*Assistant Examiner* — Paul M Janeski
(74) *Attorney, Agent, or Firm* — Womble Carlyle

(57) ABSTRACT

A drill has inner and outer inserts. The drill includes a drill body having a rotational axis; an inner insert mounted adjacent to the axis at a proximal end of the drill body having an axis-symmetrical contour having four cutting edges and four rounded corners; and an outer insert identical to the inner insert being mounted farther away from the axis than the inner insert. Loci of the inner and the outer insert partially overlap. At the overlapping region, the cutting edge of the inner insert and the cutting edge of the outer insert extend toward the axis in a direction to a workpiece and the locus of the cutting edge of the inner insert protrudes in a direction to the workpiece along the axis of the drill body compared to the locus of the cutting edge of the outer insert.

12 Claims, 14 Drawing Sheets

U.S. PATENT DOCUMENTS

| | | | |
|---|---|---|---|
| 7,695,221 B2 | 4/2010 | Kruszynski et al. | |
| 2003/0161696 A1 | 8/2003 | Fritsch et al. | |
| 2003/0223833 A1 | 12/2003 | Roman | |
| 2008/0170916 A1* | 7/2008 | Ballas et al. | 407/42 |
| 2008/0181737 A1* | 7/2008 | Limell et al. | 408/188 |
| 2010/0111627 A1* | 5/2010 | Bae | 408/200 |

FOREIGN PATENT DOCUMENTS

| | | |
|---|---|---|
| EP | 0 088 505 A1 | 9/1983 |
| EP | 0875322 A1 | 11/1998 |
| KR | 2002-0050976 | 6/2002 |
| KR | 2007-0019319 | 2/2007 |
| RU | 2071873 C1 | 1/1997 |
| SU | 1002105 A | 3/1983 |
| SU | 1346352 A1 | 10/1987 |
| WO | WO 95/30505 A1 | 11/1995 |
| WO | WO 2006/065193 | 6/2006 |

OTHER PUBLICATIONS

Decision on Grant dated Apr. 22, 2011 issued in corresponding RU application No. 2010100967/02.

Extended European Search Report dated Sep. 26, 2012 issued in EP counterpart application (No. 1217931.9 division of EP 07746913.8).

International Search Report in PCT/KR2007/002879, dated Feb. 19, 2008.

Written Opinion in PCT/KR2007/002879, dated Feb. 19, 2008.

Extended European Search Report dated Feb. 17, 2012 issued in counterpart European Application (No. 07746913.8).

* cited by examiner (A)

rotational axis (B)     rotational axis (C)

(A)

(B)

(C)

rotational axis

DRILL WITH CUTTING INSERTS

TECHNICAL FIELD

The present invention generally relates to a drill with cutting inserts comprising an inner insert and an outer insert. More particularly, the present invention relates to a drill with cutting inserts comprising an inner insert and an outer insert, which have generally quadrangular shapes and four identical cutting inserts.

BACKGROUND ART

As shown in FIG. 1(A), the conventional insert-type drill has two square-shaped cutting inserts, which are disposed at inner and outer sides of the drill body. The inner and outer inserts are disposed opposite from each other with respect to a rotational axis of the drill body. FIGS. 1(B) and (C) show the inner insert and a cutting edge of the outer insert being rotated by 180 degrees with respect to the rotational axis of the drill body. Accordingly, they show a relative positional relationship between a cutting edge of the inner insert and a cutting edge of the outer insert during a drilling operation.

The diameter of the insert-type drill varies with the distance between the inner insert and the outer insert. When the inner insert and the outer insert are disposed as shown in FIG. 1(C), only the cutting edge of the inner insert protrudes at a region where the rotational loci of the cutting edges of the inner insert and the outer insert overlap. Thus, a workpiece is cut by only the inner insert during a drilling operation. However, when the inner insert and the outer insert are disposed more closely to each other as shown in FIG. 1(B), the cutting edges of the inner insert and the outer insert both protrude at the region where the rotational loci of the inner insert and the outer insert overlap. Thus, during a drilling operation, the workpiece is cut in turn by the two cutting edges. Accordingly, during a drilling operation, long and thin chips are generated to surround a side surface of the drill body not being parted and intervene between the drill body and the hole being drilled. This disturbs the drilling operation and further damages the workpiece. Such an occurrence is particularly harmful to the workpiece, which is made from a relatively soft material such as soft steel. Further, at the region where the rotational loci of the inner insert and the outer insert overlap, a cutting resistance force may be concentrated at the ends of the inner and outer inserts, which protrude in turn along the rotational axis of the drill body. Thus, the lifetime of the cutting insert is reduced and stable cutting performance may not be achieved.

Korean Laid-Open Patent Publication No. 2005-7569 discloses an insert-type drill, which is different from the above-mentioned drill. As an inner insert, the drill employs an insert shown in FIG. 2(A), which comprises first and second part edges 4 and 6 connected via a transition part edge 2, while employing a conventional square-shaped insert as an outer insert. FIG. 2(B) shows a positional relationship between the two cutting inserts. FIG. 2(C) shows a relative positional relationship between the cutting edges of the inner insert and the outer insert by rotating the inner insert shown in FIG. 2(B) by 180 degrees with respect to the rotational axis.

Korean Laid-Open Patent Publication No. 2005-7568 discloses another insert-type drill. The drill employs an insert shown in FIG. 3, which comprises first and second part edges 4' and 6' connected via a transition part edge 2', as an inner insert, while employing an insert, which is mirror-symmetrical to the inner insert, as an outer insert.

In said drill, the cutting edges of the inner insert and the outer insert are generally parallel to each other at a region where the rotational loci of the inner insert and the outer insert overlap. Thus, even if the inner insert and the outer insert become closer, only the inner insert may be maintained to protrude in the overlapping region without allowing the outer insert to protrude in turn. Accordingly, as shown in FIG. 1(B), even if the inner insert and outer insert become closer, the generation of long and thin chips and the local concentration of cutting resistance, caused by the protrusion of the inner insert and outer insert in turn, will be prevented, compared to a structure that the cutting edges of an inner insert and an outer insert are disposed opposite from each other at a region where the rotational loci of the cutting edges of the inner insert and the outer insert overlap.

However, since the inner and outer inserts are not identical, the manufacture of each insert requires different metallic patterns of powder metallurgy. In addition, the production process should be individually controlled for each of the inserts. Further, a stock of the inserts should be separately managed into two types. When the inserts are mounted or substituted, great care must be taken in selecting and mounting a correct insert.

SUMMERY OF THE INVENTION

It is an object of the present invention to provide a drill with cutting inserts, which prevents inner and outer inserts from protruding in turn at the region where the inner insert and the outer insert overlap even if said inserts become closer, while simultaneously improving productivity of the inserts and achieving easier management, mounting and replacement of the inserts by making the inserts identical, thereby solving a problem in the prior art.

To achieve the above object, the present invention provides a drill, which comprises: a drill body having a rotational axis; an inner insert mounted adjacent to the rotational axis at a proximal end of the drill body, the inner insert having a symmetry axis and an axis-symmetrical contour having four cutting edges and four rounded corners; and an outer insert identical to the inner insert, the outer insert being mounted farther away from the rotational axis than the inner insert at the proximal end of the drill body, wherein the rotational loci of the inner insert and the outer insert partially overlap; wherein at the overlapping region, the cutting edge of the inner insert and the cutting edge of the outer insert incline toward the rotational axis in a direction to a workpiece; and wherein at the overlapping region, the rotational locus of the cutting edge of the inner insert protrudes in a direction to the workpiece along the rotational axis of the drill body compared to the rotational locus of the cutting edge of the outer insert.

According to a drill with cutting inserts of the present invention, inner and outer inserts are prevented from protruding in turn at the region where the inner insert and the outer insert overlap even if the inserts become closer to each other, while simultaneously improving productivity of the inserts and achieving easier stock management, mounting and replacement of the inserts by making the inserts identical.

DETAILED DESCRIPTION

Hereinafter, the present invention will be described with reference to an embodiment illustrated in the accompanying drawings.

Figure 4:
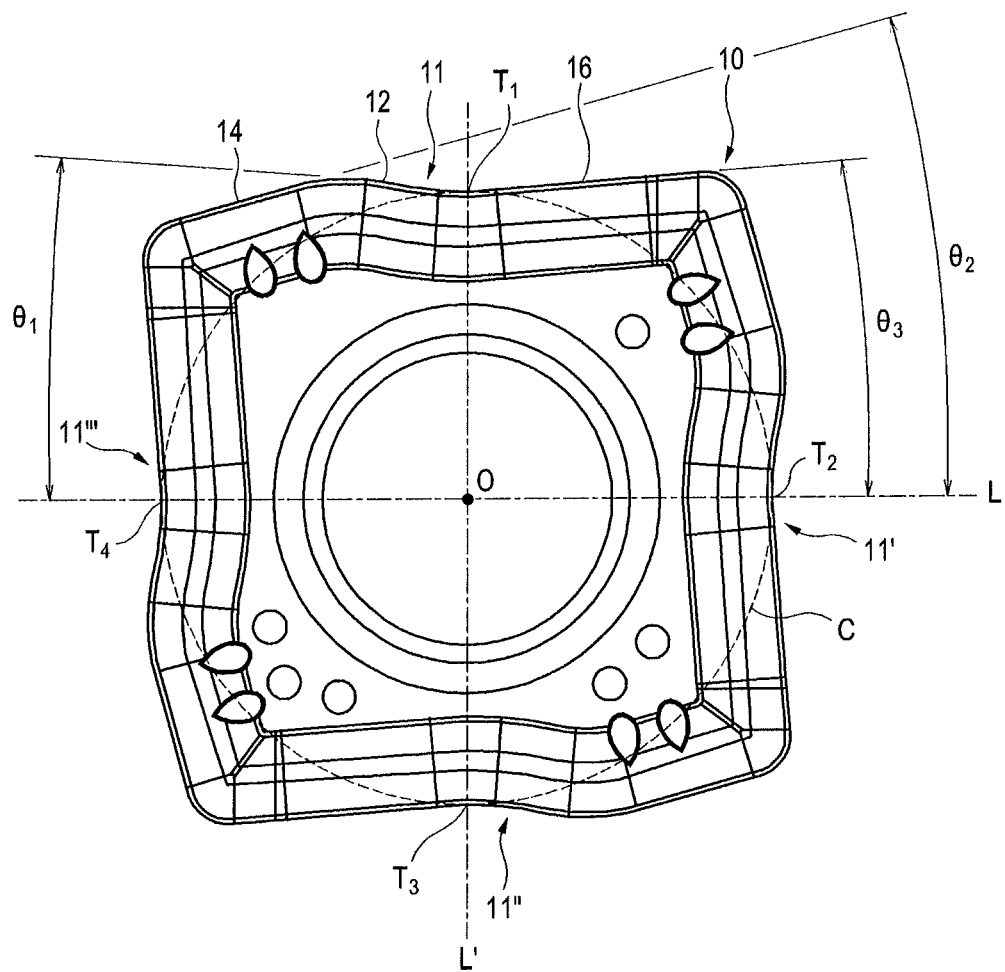
FIG. 4 is a top view of a cutting insert constructed in accordance with one embodiment of the present invention.

FIG. 4 is a top view of a cutting insert (10) constructed in accordance with one embodiment of the present invention. The cutting insert (10) is generally square-shaped having a symmetric axis with four cutting edges (11, 11', 11", 11''') and axially symmetrical contours having four rounded corners. That is, the cutting edges (11, 11', 11", 11''') are rotationally symmetric to each other around the rotational axis of the insert. Each cutting edge (11, 11', 11", 11''') has a first and a second part edges (14, 16) which are connected to each other via a transition part edge (12). The transition part edge (12), the first part edge and the second part edge (14, 16) are partially linear. A connection part between the first part edge and the transition part edge is convex, while a connection part between the transition part edge and the second part edge is concave. Each cutting edges (11, 11', 11", 11''') contacts to a virtual inscribed circle (C) at the contact points (T1, T2, T3, T4). Lines connecting the contact points which surface each other (T2 and T4; or T1 and T3) are base lines (L or L') passing on the center (O) of the cutting insert. It is preferable that the transition part edge (12) extends from the second part edge (16) in a direction away from the base line (L) while the second part edge (16) extends from the transition part edge (12) in a direction away from the partial base line (L) facing to the second part edge (16). It is also preferable that the first part edge (14) extends from the transition part edge (12) in a direction closer to the base line (L) facing to the first part edge (14).

Figure 5:
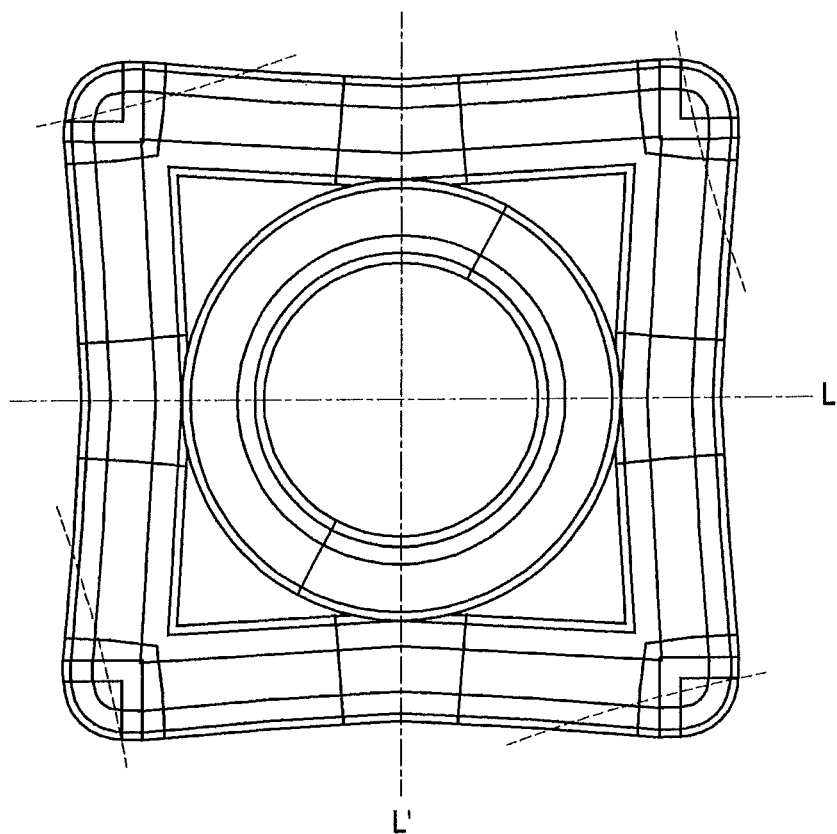
FIG. 5 is a schematic diagram illustrating the shape of the cutting insert constructed in accordance with one embodiment of the present invention.

It is preferable that an angle θ1 between the transition part edge (12) and the base line (L) is identical to an angle θ3 between the second part edge (16) and the base line (L). In this case, the shape of the cutting insert (10) is similar to a shape which is chamfered at each corner of an insert shaped as vertically and horizontally symmetric butterfly, as shown in FIG. 5 which is a schematic diagram illustrating the shape of the cutting insert constructed in accordance with one embodiment of the present invention.

Figure 1:
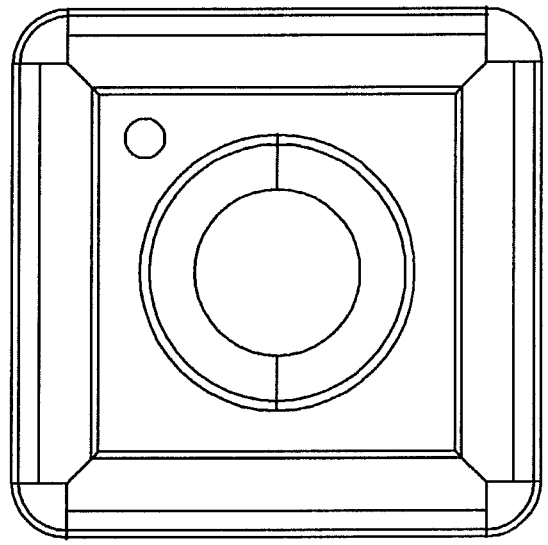
FIGS. 1 to 3 illustrate the cutting inserts of conventional insert-type drills.
Figure 1:
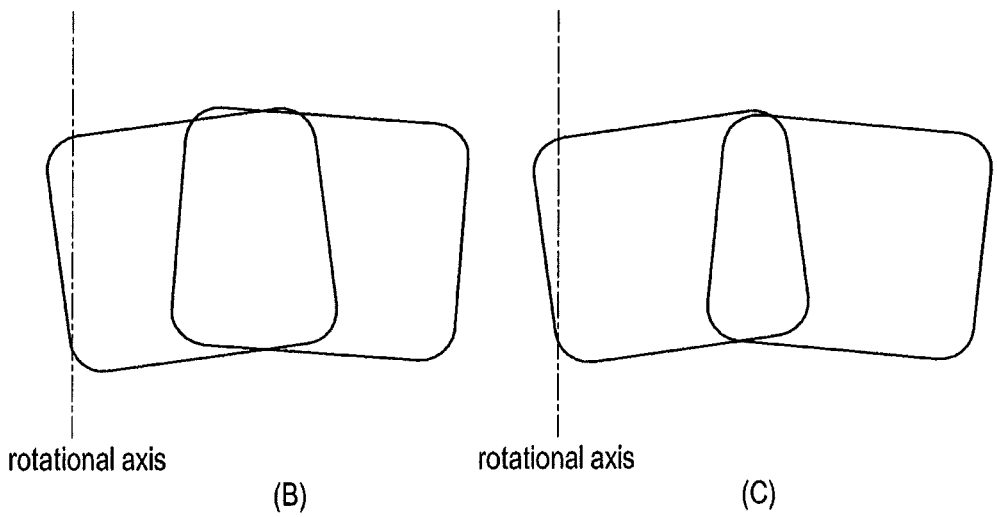
Figure 2:
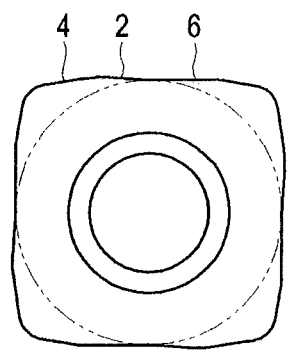
Figure 2:
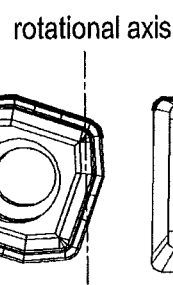
Figure 3:
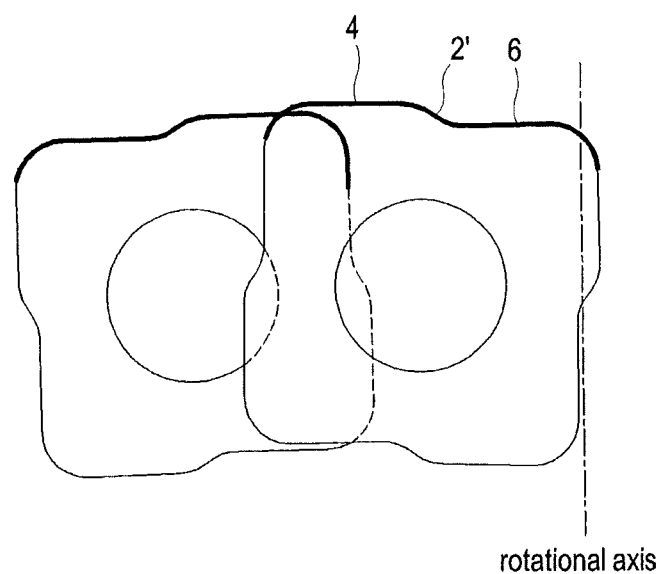

It is preferable that the angle θ1 between the transition part edge (12) and the base line (L) and angle θ3 between the second part edge (16) and the base line (L) are at about 5 degree to 7 degree while an angle θ2 between the first part edge and the base line (L) is at about 14 degree to 16 degree. This angular range has an advantage for cutting operation of the cutting insert mounted in the drill body. If the θ1, θ2 and θ3 are too wide, the cutting resistance can be concentrated thereto since the cutting edges may partially protrude. If the θ1, θ2 and θ3 are too narrow, then the problem of the conventional square-shaped cutting insert as shown in FIG. 1 will be occurred since the cutting edges will be generally linear.

Figure 6:
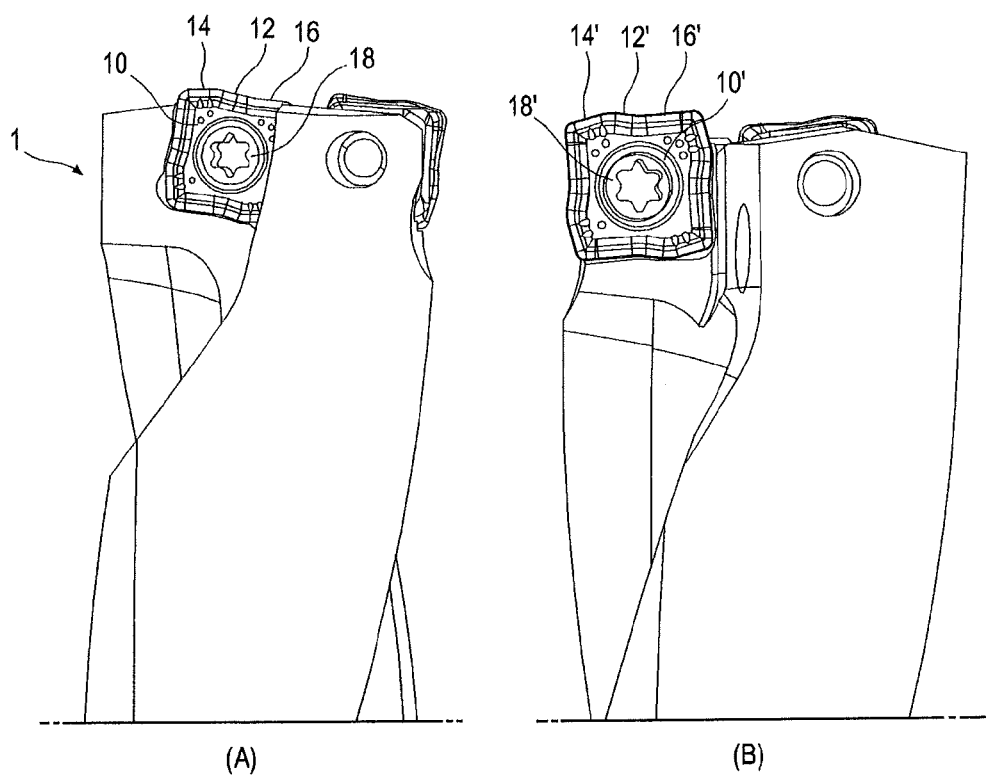
FIG. 6 is a partial side view illustrating a portion of a drill constructed in accordance with one embodiment of the present invention, which is configured to mount the cutting inserts.
Figure 7:
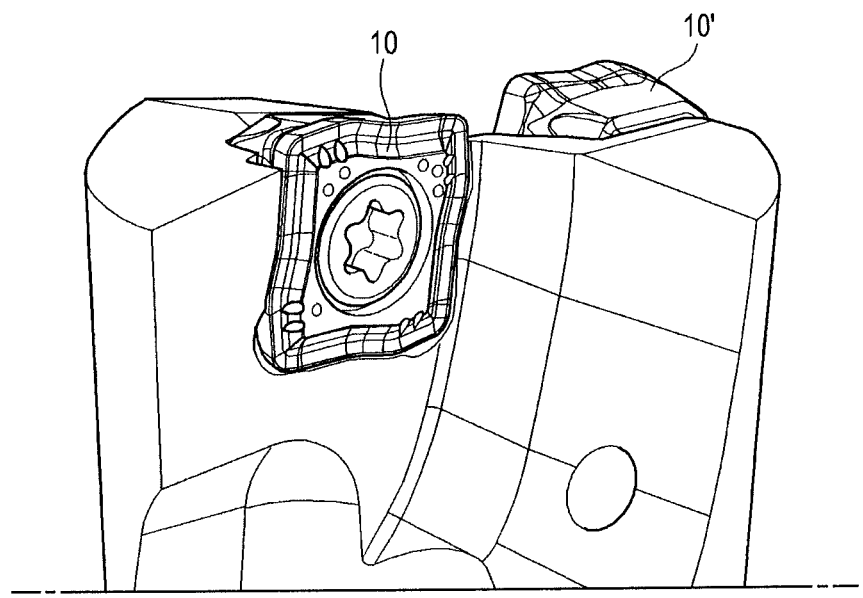
FIG. 7 is a perspective view illustrating a portion of the drill shown in FIG. 6, which is configured to mount the cutting inserts.

FIGS. 6 and 7 illustrate a drill (1) to which the cutting inserts (10, 10') is mounted. The inner cutting insert (10) and the outer cutting insert (10') are mounted to pockets of drill body head part at a proximal end of the drill body by fixing screws (18, 18'). The inner insert (10) is mounted adjacent to the rotational axis at drill body while the outer insert (10') is mounted farther away from the rotational axis. The inner insert (10) and the outer insert (10') are all identical in terms of shape, size, and materials. The second part edges (16, 16') of the inserts (10, 10') are closer to the rotational axis of the drill body than the first part edges (14, 14'). The first part edge (14) of the inner insert (10) protrudes in a direction toward a workpiece compared to the second part edge (16) while the second part edge (16') of the outer insert (10') protrudes in a direction to the workpiece compared to the first part edge (14'). FIG. 6(A) shows an inner insert (10) disposed adjacent to a rotational axis of the drill body, and FIG. 6(B) shows an outer insert (10') adjacent to the outer surface of the drill body.

Thus, manufacturing process and stock management may be made simpler and mounting to or replacement of the insert can also be made simpler, by manufacturing the inner insert and the outer insert to be identical.

Figure 8:
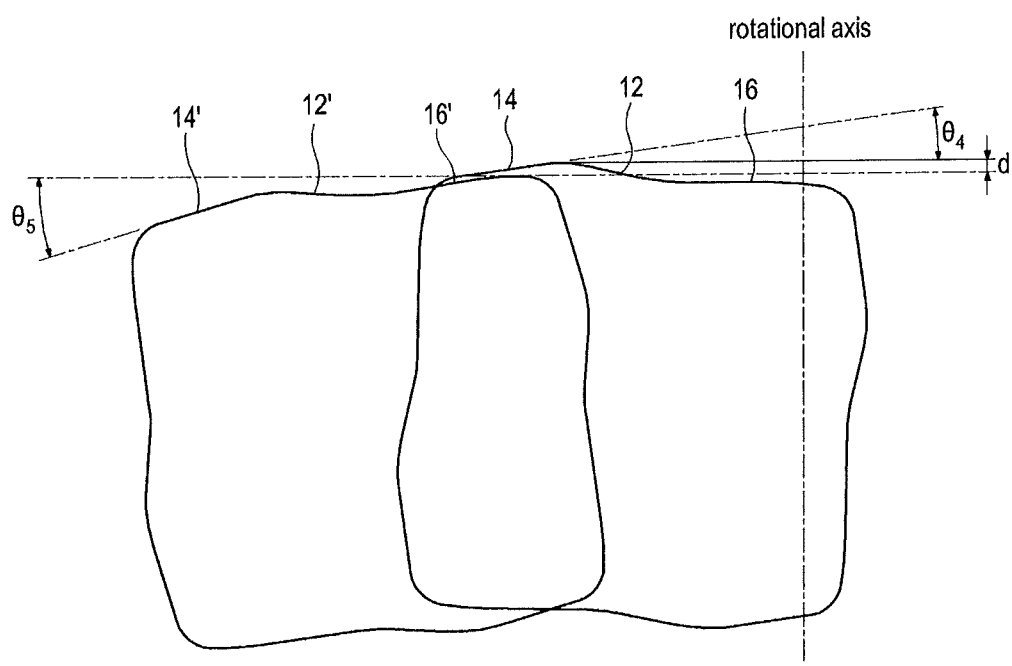
FIG. 8 illustrates a positional relationship between the cutting inserts of the drill shown in FIG. 6.

FIG. 8 illustrates a relative positional relationship of cutting edges between the inner insert (10) mounted to the drill body head part and the outer insert (10'). The inner insert (10) and the outer insert (10') are actually opposite to each other about the rotational axis as shown in FIGS. 6 and 7. However, FIG. 8 illustrates the inner insert (10) which has been rotated as 180 degree around the rotational axis of the drill body in order to easily describe the relative positional relationship of cutting edges of both cutting inserts during drilling. Although it may appear that front surfaces of both inserts are arranged on the same virtual surface in FIG. 8, in actuality, front surfaces of both inserts are relatively inclined to the virtual surface or offset from the virtual surface. In this case, the view angle by the rotation of the inner insert around the rotational axis of the drill body as above mentioned is not limited at 180 degree.

The rotation loci of the cutting edges of the inner insert (10) and the outer insert (10') at least partially overlap. Substantially all of the first part edge (14) of the inner insert (10) and the second part edge (14') of the outer insert (10') are inclined toward the rotational axis of the drill body in a direction to the workpiece in a predetermined angle. The first part edge (14) of the inner insert (10) further protrudes in a direction toward the workpiece along the rotational axis of the drill body, compared to the second part edge (16') of the outer insert.

According to these configurations, if the center of the inner insert (10) and the center of the outer insert (10') become closer to each other, the cutting edges of both inserts are prevented from protruding in turn but the cutting edge of the innser insert (10) is maintained being protruded at the region where the inner insert (10) and the outer insert (10') overlap, during drilling. That is, at the region where the inner insert (10) and the outer insert (10') overlap, the forefront corner of the front cutting edge of the outer insert (10') is maintained not to contact to the workpiece by the effective front cutting edge, and the distance between both inserts can be easily adjusted in a radial direction. Thus, long and thin chips may be prevented from being generated at the region where both inserts overlap. Also, cutting resistance may be concentrated only at the end of the cutting edge at the region where both inserts overlap.

However, it is advantageous that the first part edge (14) is inclined toward the rotational axis of the drill in a direction toward the workpiece compared to a case where the first part edge (14) of the inner insert (10) is parallel to a surface orthogonal to the rotational axis of the drill body, or compared to a case where the first part edge (14) of the inner insert (10) is inclined toward the workpiece in a direction opposite the rotational axis of the drill body. In this respect, the first part edge (14) and the transition part edge (12) may form a 'V'-shape to penetrate into and be positioned in the workpiece easily if the first part edge (14) were inclined in the direction as described above.

The portion adjacent to the transition edge (12) out of the first part edges (14) of the inner insert (10) further protrudes at a distance 'd' compared to the portion in opposite side to the transition part edge (12') out of the second part edges (16') of the outer insert (10'). It is preferable that the distance (d) is from about 0.12 mm to about 0.15 mm, which may vary depending upon the amount drilled (mm/revolutions) during cutting with the drill.

The first part edge (14) of the inner insert is inclined to a surface orthogonal to the rotational axis of the drill body with an angle θ4. The angle θ4 may be less than about 5 degrees, and more preferably may be from 3 degrees to about 5 degrees. If θ4 is too wide, the cutting resistance will be reduced but the drill may operate unstably. If θ4 is too narrow, the drill will operate stably but the cutting resistance may increase.

Since the first part edge (14) of the inner insert (10) extends inclined with a relatively small angle to the surface orthogonal to the rotational axis of the drill body, the cutting resistance can be distributed uniformly when the first part edge (14) of the inner insert penetrates into the workpiece.

Further, the first part edge (14') of the outer insert (10') is inclined toward the rotational axis in a direction toward the workpiece. Specifically, the first part edge (14') of the outer insert (10') is inclined to a surface orthogonal to rotational axis of the drill body with an angle θ5. Preferably, the angle θ5 is from about 18 degrees to about 19 degrees. The range of the numeric dimensions is advantageous for penetration of the first part edge (14') of the outer insert (10') into the workpiece. If the angle θ5 is too wide, the drill may operate unstably.

The transition part edge (12') of the outer insert (10') is inclined toward the rotational axis in a direction opposite to the workpiece, opposing the first part edge (14'). Thus, the first part edge (14') of the outer insert (10') and the transition part edge (12') form a 'V'-shape while easily penetrating and being located into the workpiece. Further, the cutting resistances applied to the first part edge (14') and the transition part edge (12') may be reduced by cancelling each other partially.

The transition part edge (12') of the outer insert (10') is disposed in front of the second part edge (16) of the inner insert (10) in a direction toward the workpiece. Thus, the transition part edge (12') of the outer insert (10') and the second part edge (16) of the inner insert (10) penetrate into the workpiece sequentially, and the cutting resistance can be relatively reduced in the case of simultaneous penetration of them.

Figure 9:
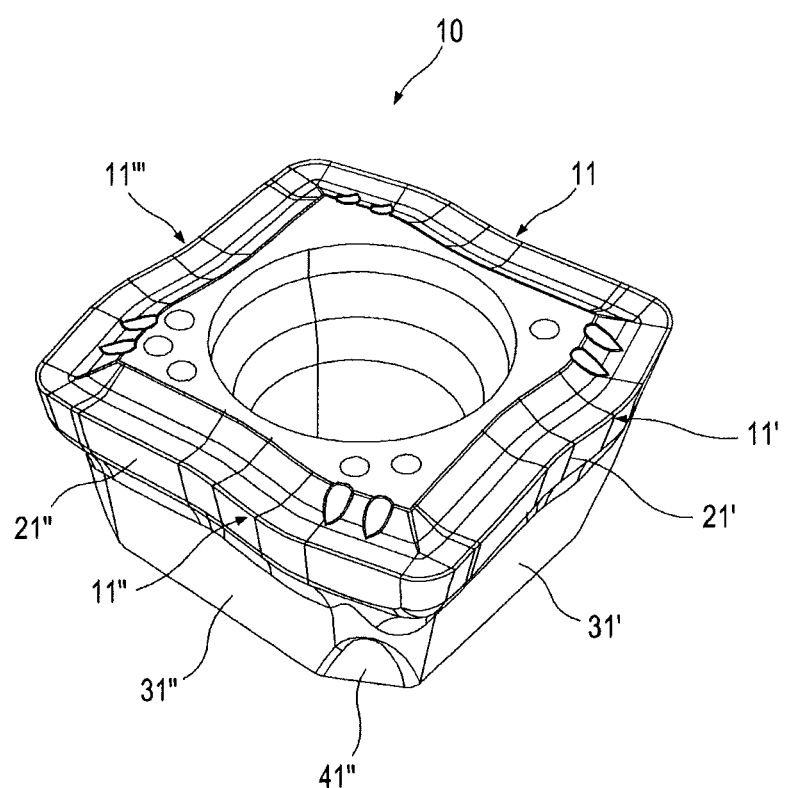
FIG. 9 is a perspective view of the cutting insert shown in FIG. 6.
Figure 10:
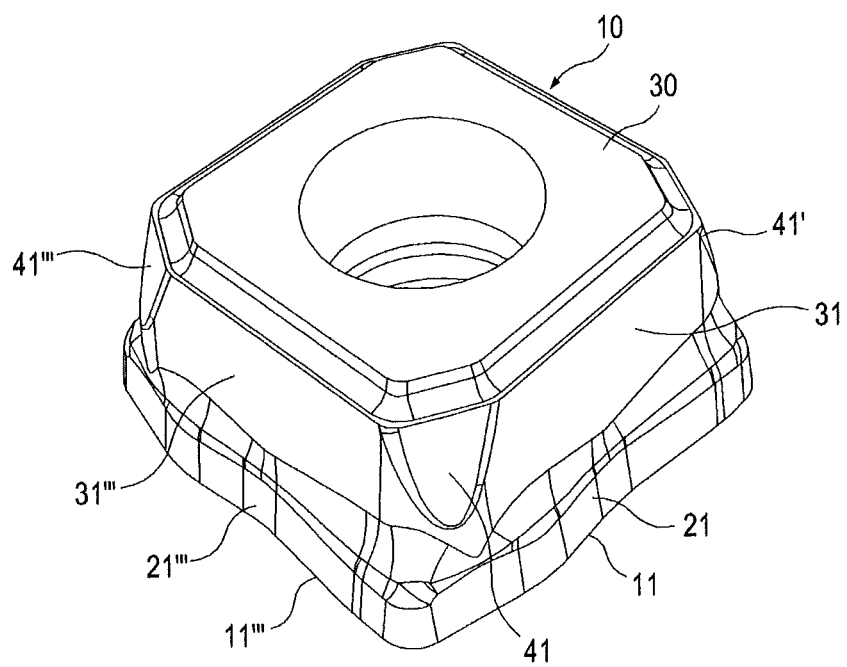
FIG. 10 is a rear perspective view of the cutting insert shown in FIG. 6.

FIG. 9 is a perspective view showing the upper side surface of a cutting insert of an embodiment in accordance with the present invention, and FIG. 10 is a perspective view showing the lower side surface of a cutting insert of an embodiment in accordance with the present invention. The cutting insert includes four side walls which are rotationally symmetric to each other. Each of the walls includes upper side surfaces (21, 21', 21'', 21''') extending along the geometric contour of the four cutting edges (11, 11', 11'', 11''') from the top surface of the cutting edge and flat lower side surfaces (31, 31', 31'', 31''') extending from the bottom surface of the cutting edge. Corners between the adjacent lower side surfaces (31, 31', 31'', 31''') are chamfered to form a chamfered surface (41, 41', 41'', 41'''). The bottom surface (30) of the cutting insert is flat as shown in FIG. 10.

Figure 11:
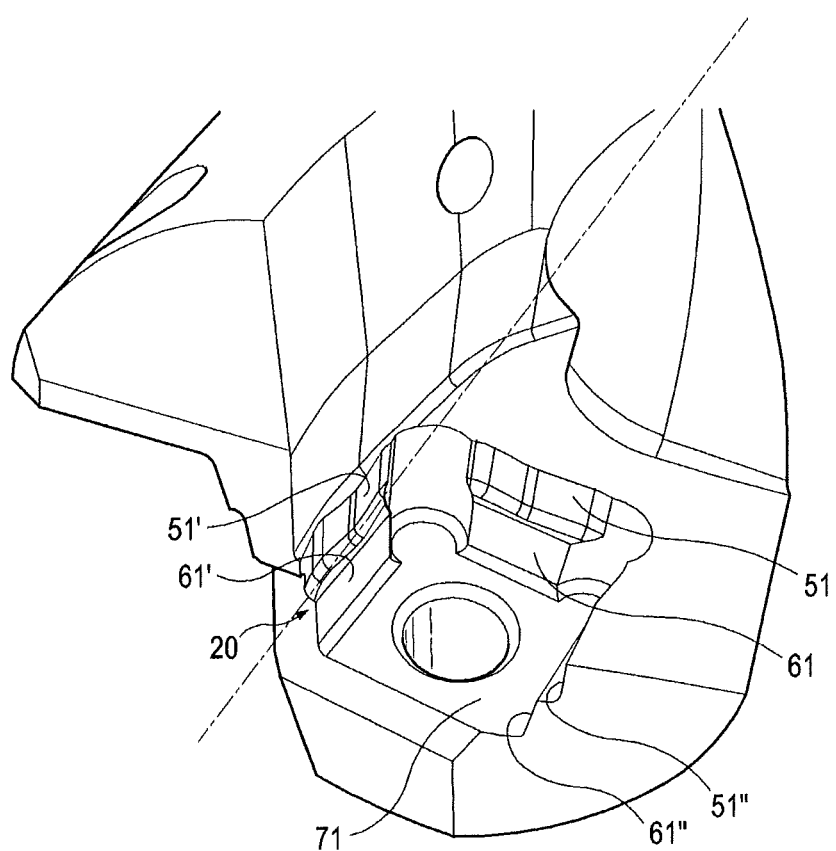
FIG. 11 is a perspective view of a pocket configured to mount the inner insert shown in FIG. 6.
Figure 12:
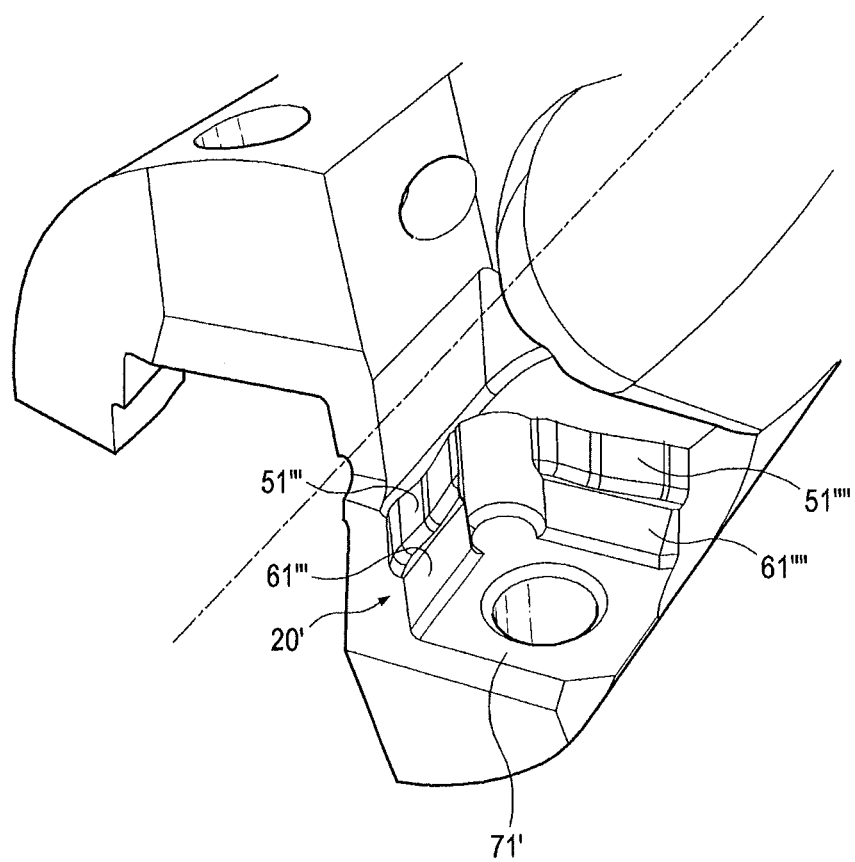
FIG. 12 is a perspective view of a pocket configured to mount the outer insert shown in FIG. 6.

FIGS. 11 and 12 are illustrative perspective views of a pocket of a drill body head part mounting cutting inserts (10, 11') of an embodiment in accordance with the present invention. FIG. 11 illustrates an inner pocket (20) mounting inner insert (10) and FIG. 12 illustrates an outer pocket (20') mounting the outer insert (10'). The inner pocket (20) is formed at the proximal end of the drill body adjacent to the rotational axis and the outer pocket (20') is formed at the proximal farther away from the rotational axis than the inner pocket (20) at the proximal end of the drill body. Each pockets includes first walls (51, 61, 51'''', 61'''') opposing the workpiece, second walls (51', 61', 51''', 61''') adjacent to the rotational axis of the drill body, the second walls being perpendicular to the first walls, second walls (51, 61, 51'''', 61'''') opposing the workpiece, and bottom surfaces (71, 71'). The inner pocket (20) further includes third walls (51'', 61'') opposing to the second walls (51', 61'). The first walls, the second walls and the third walls have upper side surfaces (51, 51', 51'', 51''', 51'''') curved corresponding to the upper side surfaces (21, 21', 21, 21''') of the cutting edges (10, 10'), lower side surfaces (61, 61', 61'', 61''', 61'''') which is flat corresponding to the lower side surfaces (31, 31', 31'', 31''') of the cutting inserts (10, 10'), and flat bottom surfaces (71, 71') corresponding to the bottom surface (30) of the cutting inserts (10, 10').

The cutting insert (10, 10') having identical shape and size are mounted to the inner pocket (20) and the outer pocket (20'). Thus, the first walls (51, 61) of the inner pocket and the first walls (51'''', 61'''') of the outer pocket include at least partially identical surfaces, the second walls (51', 61) of the inner pocket and the second walls (51''', 61''') include at least partially identical surfaces.

Preferably, when the cutting inserts (10, 10') are mounted to the pockets (20, 20'), the cutting edges (10, 10') are supported by contact only on the flat bottom surfaces (71, 71') of the pocket (20, 20'), lower side surfaces (61, 61'''') of the first walls and the lower side surfaces (61', 61''') of the second walls. That is, the upper side surfaces (21, 21', 21'', 21''') extending along the geometric contour of the cutting edges of the cutting inserts (10, 10') and corresponding upper side surfaces (51, 51', 51'', 51''') of the pockets (20, 20') do not contact each other, instead being separated from each other.

For example, when the inner insert (10) is mounted to the inner pocket (20), the flat lower side surfaces (31, 31') are supported by a respective contact on the flat lower side surfaces (61, 61') of the inner pocket (20), and the flat bottom surface (30) of the inner insert is supported by a contact on the flat bottom surface (71) of the inner pocket (20). Further, for example, when the outer insert (10') is mounted to the outer pocket (20'), the lower side surfaces (31, 31') of the outer insert (10') are supported by respective contact on the flat lower side surfaces (61''', 61'''') of the outer pocket (20'), and the flat bottom surface (30) of the outer insert is supported by a contact on the flat bottom surface (71') of the outer pocket (20').

Advantageously, bottom surfaces (71, 71') of the pockets (20, 20') and lower side surfaces (61, 61', 61", 61'", 61"") each having a flat shape must be manufactured with correct clearance while the upper side surfaces (51, 51', 51", 51'", 51"") each having a curved complex shape corresponding to the upper side surfaces (61, 61', 61", 61'", 61"") of the cutting inserts (10, 10') can be manufactured with relatively large clearance. Then, the pocket (20, 20') can be manufactured with cost and time efficiencies. However, a gap between the upper side surfaces (61, 61', 61", 61'", 61"") of the cutting inserts (10, 10') with curved shape and corresponding upper side surfaces (51, 51', 51", 51'", 51"") of the pockets must be small enough to prevent small fragments of the chips from intruding therebetween.

Figure 13:
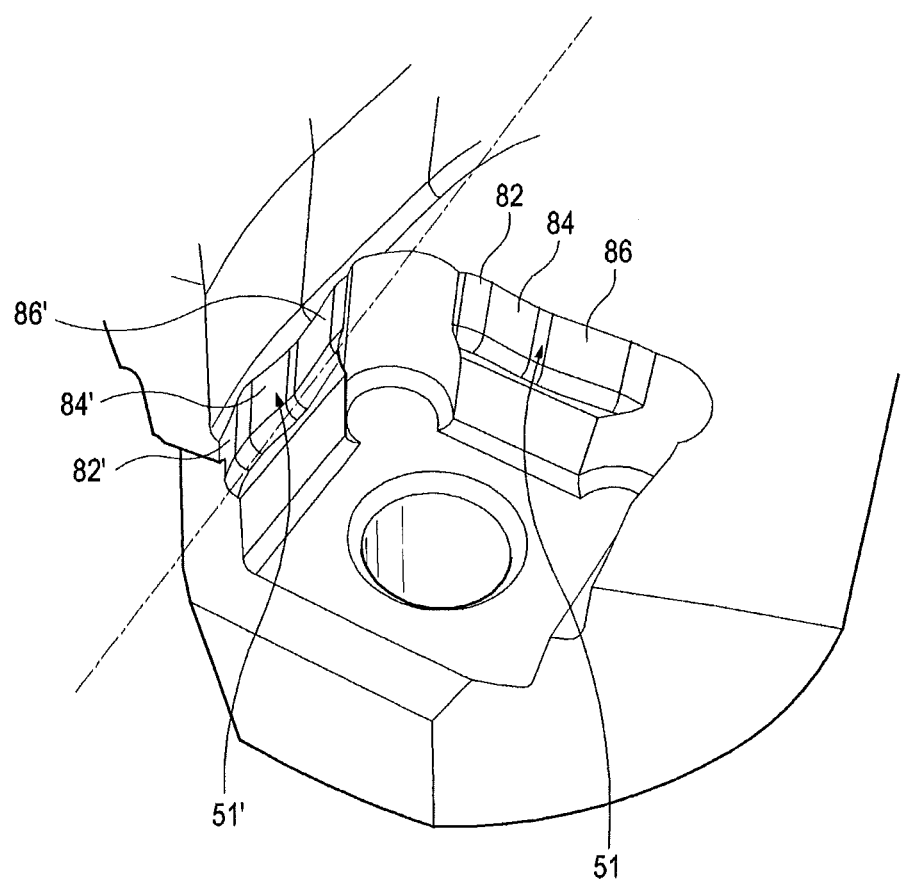
FIGS. 13 and 14 are enlarged views of the pockets shown in FIGS. 11 and 12.
Figure 14:
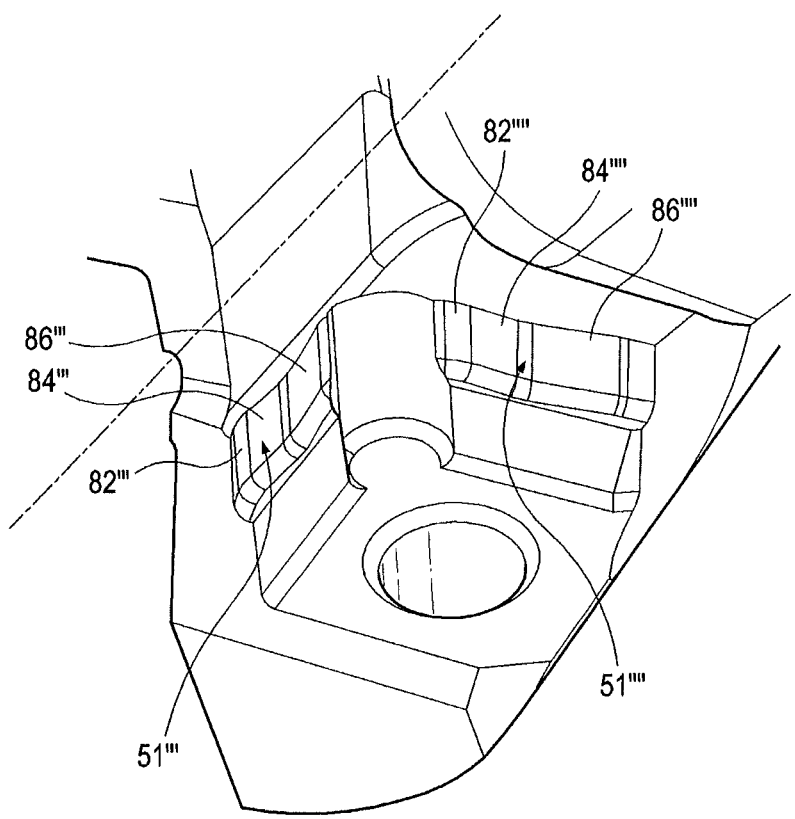

FIGS. 13 and 14 are enlarged views of the inner pocket (20) and outer pocket (20') shown in FIGS. 11 and 12. As shown in FIGS. 13 and 14, the upper side surface (51) of the first wall of inner pocket (20) and the upper side surface (51"") of the first wall of the outer pocket (20') have first part surfaces (82, 82""), transition part surfaces (84, 84"") and the second part surfaces (86, 86"") in a direction away from the rotational axis of the drill body. Further, the upper side surface (51') of the second wall of the inner pocket (20) and the upper side surface (51'") of the second wall of the outer pocket (20') have first part surfaces (82', 82'"), transition part surfaces (84', 84'") and the second part surfaces (86', 86'") in a direction away from the workpiece. The first part surface (82) of the upper side surface (51) of the first wall of the inner pocket (20) and the second part surface (86"") of the upper side surface (51"") of the first wall of the outer pocket (20') incline toward rotational axis of the drill body in a direction toward the workpiece. Further, the first part surface (82') of the upper side surface (51') of the second wall of the inner pocket (20) inclines toward the rotational axis of the drill body in a direction toward the workpiece, and the second part surface (86'") of the upper side surface (51'") of the second wall of the outer pocket (20') inclines toward the workpiece in a direction opposite the rotational axis of the drill body. This is because the first part edge (14) of the inner insert (10) and the second part edge (16') of the outer insert (10') incline toward the rotational axis of the drill body in a direction toward the workpiece in a predetermined angle at the region where the inner insert (10) mounted on the inner pocket (20) and the outer insert (10') overlap and because four cutting edges of the inner insert (10) and the outer insert (10') are rotational symmetric to each other. That is, the first part surface (82) of the upper side surface (51) of the first wall of the inner pocket (20) and the second part surface (86"") of the upper side surface (51"") of the first wall of the outer pocket (20') has a shape suitable to receive the cutting edge parts of the inner insert (10) and the outer insert (10') of which the locus of rotation overlap each other as shown in FIG. 8 with about 180 degree rotational symmetric relation, respectively. Thus, the directionality describe above can be obtained. Further, the first part surface (82') of the upper side surface (51') of the second wall of the inner pocket (20) and the second part surface (86'") of the upper side surface (51'") of the second wall of the outer pocket (20') has a shape suitable for receiving the cutting edge parts of the inner insert (10) and the outer insert (10') of which the locus of rotation overlap each other as shown in FIG. 8 with about 90 degree rotational symmetric relation, respectively. Thus, the directionality described above can be obtained.

While the present invention has been described with respect to a preferred embodiment of the invention and is exemplary, it will be apparent to those skilled in the art that variations of the present invention are possible without deviating from the range of the present invention.

According to a drill with cutting inserts of the present invention, inner and outer inserts are prevented from protruding in turn at the region where the inner insert and the outer insert overlap even if said inserts become closer, while simultaneously improving productivity of the inserts and achieving easier management, mounting and replacement of the inserts by making the inserts identical.

The invention claimed is:

1. A drill for cutting a workpiece, the drill comprising:
   a drill body having a rotational axis;
   an inner insert mounted adjacent to the rotational axis at a proximal end of the drill body, the inner insert having a symmetry axis and an axis-symmetrical contour having four cutting edges and four rounded corners; and
   an outer insert being substantially identical to the inner insert, the outer insert being mounted further away from the rotational axis than the inner insert at the proximal end of the drill body,
   wherein, as mounted on the drill body, the inner insert and the outer insert each have a front cutting edge,
   wherein rotational loci of the inner insert and the outer insert at least partially overlap to form an overlapping region therewith,
   wherein at the overlapping region, the front cutting edge of the inner insert and the front cutting edge of the outer insert incline toward the rotational axis in a direction toward the workpiece, and
   wherein at the overlapping region, the rotational locus of the front cutting edge of the inner insert protrudes in a direction toward the workpiece along the rotational axis of the drill body compared to the rotational locus of the front cutting edge of the outer insert.

2. The drill of claim 1, wherein the front cutting edge of each of the inserts has a first part edge, a transition part edge and a second part edge, each of the edges being partially linear and sequentially arranged from an opposite side to the rotational axis; and
   wherein a connection part between the first part edge and the transition part edge is convex while a connection part between the transition part edge and the second part edge is concave.

3. The drill of claim 2, wherein the transition part edge of the front cutting edge of the outer insert is positioned in front of the second part edge of the front cutting edge of the inner insert in a direction toward the workpiece.

4. The drill of claim 2, wherein the first part edge of the front cutting edge of the outer insert inclines toward the rotational axis in a direction toward the workpiece, while the transition part edge of the front cutting edge of the outer insert inclines toward the rotational axis in a direction away from the workpiece.

5. The drill of claim 2, wherein the inner insert and the outer insert each comprise a respective bottom surface and respective four side walls rotationally symmetrically positioned with respect to each other;
   wherein each of the side walls comprises a respective flat lower side surface adjacent to the bottom surface and a respective curved upper side surface extending from the lower side surface; and
   wherein each of the inserts are supported by contact to the drill body only on the bottom surface and the flat lower side surfaces of two of the side walls.

6. The drill of claim 2, wherein the first part edge of the front cutting edge of the inner insert inclines toward the rotational axis in a direction toward the workpiece; and wherein a forefront corner of the front cutting edge of the outer insert is in an axially rear position to the first part edge of the front cutting edge of the inner insert.

7. The drill of claim 6, wherein the transition part edge of the front cutting edge of the outer insert is positioned in front of the second part edge of the front cutting edge of the inner insert in a direction toward the workpiece.

8. The drill of claim 6, wherein the first part edge of the front cutting edge of the outer insert inclines toward the rotational axis in a direction toward the workpiece, while the transition part edge of the front cutting edge of the outer insert inclines toward the rotational axis in a direction away from the workpiece.

9. The drill of claim 6, wherein the inner insert and the outer insert each comprise a respective bottom surface and respective four side walls rotationally symmetrically positioned with respect to each other;

wherein each of the side walls comprises a respective flat lower side surface adjacent to the bottom surface and a respective curved upper side surface extending from the lower side surface; and wherein each of the inserts are supported by contact to the drill body only on the bottom surface and the flat lower side surfaces of two of the side walls.

10. A drill body for a drill having a rotational axis, comprising:

an inner pocket formed adjacent to the rotational axis at a proximal end of the drill body; and an outer pocket formed further away from the rotational axis than the inner pocket at the proximal end of the drill body, wherein each of the pockets comprises a first wall facing the workpiece, a second wall substantially perpendicular to the first wall and disposed adjacent to the rotational axis of the drill body, and a bottom surface, wherein each of the first wall and the second wall comprise a respective flat lower side surface adjacent to the bottom surface and a respective curved upper surface extending from the lower side surface, and wherein the first walls of the inner and outer pockets include identical surface shapes while the second walls of the inner and outer pockets include identical surface shapes.

11. The drill body for a drill of claim 10, wherein each of the upper side surface of the first wall of the inner pocket and the upper side surface of the first wall of the outer pocket comprises a first part surface, a transition part surface and a second part surface sequentially arranged in a direction away from the rotational axis, and wherein the first part surface of the upper side surface of the first wall of the inner pocket and the second part surface of the upper side surface of the first wall of the outer pocket incline toward the rotational axis of the drill body in a direction toward the workpiece.

12. The drill body for a drill of claim 10, wherein each of the upper side surface of the second wall of the inner pocket and the upper side surface of the second wall of the outer pocket comprises a first part surface, a transition part surface and a second part surface sequentially arranged in a direction away from the workpiece, and wherein the first part surface of the upper side surface of the second wall of the inner pocket inclines toward the workpiece in a direction toward the rotational axis of the drill body while the second part surface of the upper side surface of the second wall of the outer pocket inclines toward the workpiece in a direction away from the rotational axis of the drill body.

\* \* \* \* \*